(12) United States Patent
Zhou et al.

(10) Patent No.: US 7,769,939 B2
(45) Date of Patent: Aug. 3, 2010

(54) APPARATUS AND METHOD FOR INTERFACING ELECTRONIC DEVICES

(75) Inventors: Fengshuan Zhou, Carmel, IN (US); Sin Hui Cheah, Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 459 days.

(21) Appl. No.: 11/474,820

(22) Filed: Jun. 26, 2006

(65) Prior Publication Data

US 2008/0126660 A1    May 29, 2008

(51) Int. Cl.
*G06F 13/00* (2006.01)
*G06F 13/42* (2006.01)
*H04J 1/00* (2006.01)

(52) U.S. Cl. .................. 710/303; 710/106; 370/480
(58) Field of Classification Search .......... 710/2, 710/5, 14, 300–304, 105–106; 370/295, 370/302, 480
See application file for complete search history.

(56) References Cited

U.S. PATENT DOCUMENTS

| | | | | |
|---|---|---|---|---|
| 3,949,171 A | * | 4/1976 | Painter | 370/203 |
| 4,953,156 A | * | 8/1990 | Olshansky et al. | 398/76 |
| 5,210,846 A | * | 5/1993 | Lee | 710/115 |
| 6,088,752 A | * | 7/2000 | Ahern | 710/303 |
| 6,275,509 B1 | * | 8/2001 | Schlosser et al. | 370/527 |
| 6,281,880 B1 | * | 8/2001 | Rose et al. | 345/158 |
| RE37,864 E | * | 10/2002 | Akagiri et al. | 341/118 |
| 6,594,719 B1 | * | 7/2003 | Ahern et al. | 710/300 |
| 6,687,779 B1 | * | 2/2004 | Sturm et al. | 710/305 |
| 6,831,975 B1 | * | 12/2004 | Easwaran et al. | 379/390.02 |
| 2003/0093607 A1 | * | 5/2003 | Main et al. | 710/306 |
| 2006/0067698 A1 | * | 3/2006 | Chan et al. | 398/141 |

FOREIGN PATENT DOCUMENTS

DE    10003705 A1  *  8/2001

* cited by examiner

*Primary Examiner*—Thomas J Cleary
(74) *Attorney, Agent, or Firm*—Robert D. Shedd; Joseph J. Opalach; Reitseng Lin

(57) ABSTRACT

An interface apparatus (20) such as a docking station interfaces various electronic devices (30, 40, 50) and reduces the number of required connector pins and input/output (I/O) ports. According to an exemplary embodiment, the interface apparatus (20) includes a first circuit (22), a second circuit (24) and a third circuit (26). The first circuit (22) provides an output signal indicating a connection to a first electronic device (10). The second circuit (24) controls a switching function of the interface apparatus (20) responsive to a first electrical signal from the first electronic device (10). The third circuit (26) generates a control signal for controlling a second electronic device (50) responsive to a second electrical signal from the first electronic device (10). The output signal, the first electrical signal, and the second electrical signal are transmitted between the interface apparatus (20) and the first electronic device (10) through a single lead.

17 Claims, 4 Drawing Sheets

APPARATUS AND METHOD FOR INTERFACING ELECTRONIC DEVICES

BACKGROUND OF THE INVENTION

1. Field of the Invention

The present invention generally relates to an apparatus and method for interfacing electronic devices that is capable of reducing the number of required connector pins of a multi-pin connector and/or the number of required input/output (I/O) ports of a processor.

2. Background Information

Certain electronic devices, such as hand-held personal media players, may utilize an interface apparatus such as a docking station to perform certain functions such as battery re-charging, data transfer with other devices and/or other functions. The connection between such an electronic device and its interface apparatus may for example be achieved through multi-pin connectors (i.e., one male connector and one female connector). One approach for using multi-pin connectors in this context is to dedicate a given pin connection to a given function. In this manner, "X" pin connections would yield "X" corresponding functions. A given pin connection may also correspond to a given I/O port of a processor within the electronic device.

With the aforementioned type of design, functional limitations arise based on the number of available pin connections and/or the number of processor I/O ports. These limitations may be particularly problematic for certain types of electronic devices and interface apparatuses where issues, such as size constraints, may significantly restrict the number of available pin connections and/or the number of processor I/O ports.

Accordingly, there is a need for an apparatus and method for interfacing electronic devices that addresses the foregoing problems and is capable of reducing the number of required connector pins of a multi-pin connector and/or the number of required I/O ports of a processor. The present invention addresses these and/or other issues.

SUMMARY OF THE INVENTION

In accordance with an aspect of the present invention, an apparatus for interfacing electronic devices is disclosed. According to an exemplary embodiment, the apparatus comprises a first circuit, a second circuit, and a third circuit. The first circuit is operative to provide an output signal indicating a connection to a first electronic device. The second circuit is operative to control a switching function of the apparatus responsive to a first electrical signal from the first electronic device. The third circuit is operative to generate a control signal for controlling a second electronic device responsive to a second electrical signal from the first electronic device. The output signal, the first electrical signal, and the second electrical signal are transmitted between the apparatus and the first electronic device through a single lead.

In accordance with another aspect of the present invention, a method for interfacing electronic devices is disclosed. According to an exemplary embodiment, the method comprises steps of using a first circuit of an interface apparatus to provide an output signal indicating a connection between the interface apparatus and a first electronic device, using a second circuit of the interface apparatus to control a switching function responsive to a first electrical signal from the first electronic device, using a third circuit of the interface apparatus to generate a control signal for controlling a second electronic device responsive to a second electrical signal from the first electronic device, and wherein the output signal, the first electrical signal, and the second electrical signal are transmitted between the interface apparatus and the first electronic device through a single lead.

In accordance with another aspect of the present invention, an electronic device is disclosed. According to an exemplary embodiment, the electronic device comprises first means and second means. The first means connects the electronic device to an interface apparatus. The second means receives an output signal from the interface apparatus indicating a connection with the interface apparatus, generates a first electrical signal for controlling a switching function of the interface apparatus, and generates a second electrical signal for causing the interface apparatus to transmit a control signal that controls a second electronic device. The output signal, the first electrical signal, and the second electrical signal are transmitted between the electronic device and the interface apparatus through a single lead.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
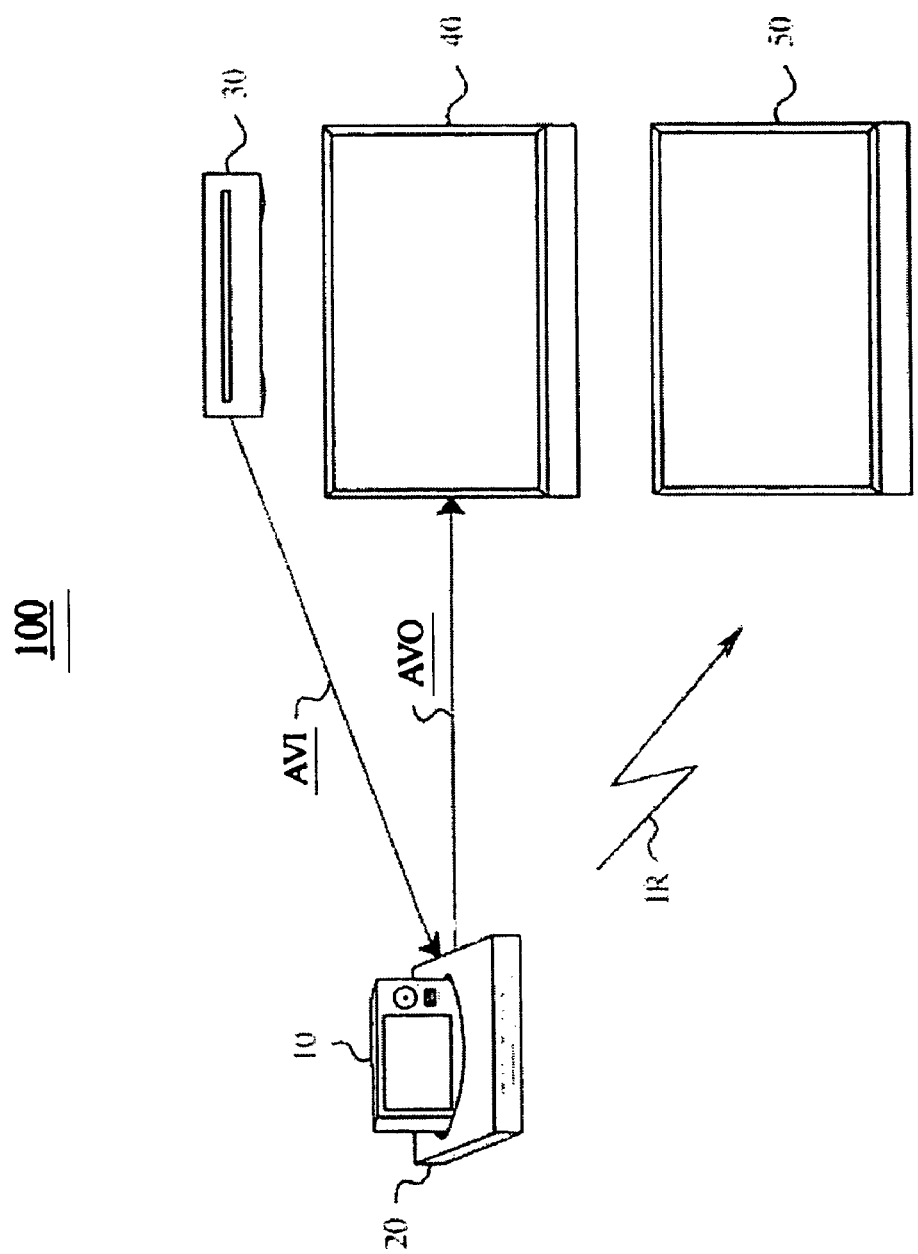
FIG. 1 shows an exemplary environment for implementing the present invention.

Referring now to the drawings, and more particularly to FIG. 1, an exemplary environment 100 for implementing the present invention is shown. As indicated in FIG. 1, environment 100 comprises a first electronic device 10, an interface apparatus 20, and additional electronic devices 30, 40 and 50. According to an exemplary embodiment, first electronic device 10 is embodied as a personal media device capable of reproducing and/or recording audio and/or video content. First electronic device 10 may for example be embodied as a Lyra model X3000 manufactured by Thomson, Inc. Further exemplary details regarding first electronic device 10 will be provided later herein with reference to FIG. 2.

First electronic device 10 may be connected to interface apparatus 20 in the manner shown in FIG. 1. According to an exemplary embodiment, interface apparatus 20 is embodied as a docking station for first electronic device 10 and facilitates data transfer between first electronic device 10 and additional electronic devices 30, 40 and 50. Electronic device 30 may for example be embodied as a digital versatile disc (DVD) player or other device which provides an audio and/or video input (AVI) to first electronic device 10 through interface apparatus 20. Electronic device 40 may for example be embodied as a television signal receiver or other device which receives an audio and/or video output (AVO) from first electronic device 10 through interface apparatus 20. Electronic device 50 may for example be embodied as a television signal receiver or other device which receives a command from first electronic device 10 via an infrared (IR) control signal from interface apparatus 20. Further exemplary details regarding interface apparatus 20 will be provided later herein with reference to FIG. 3.

Figure 2:
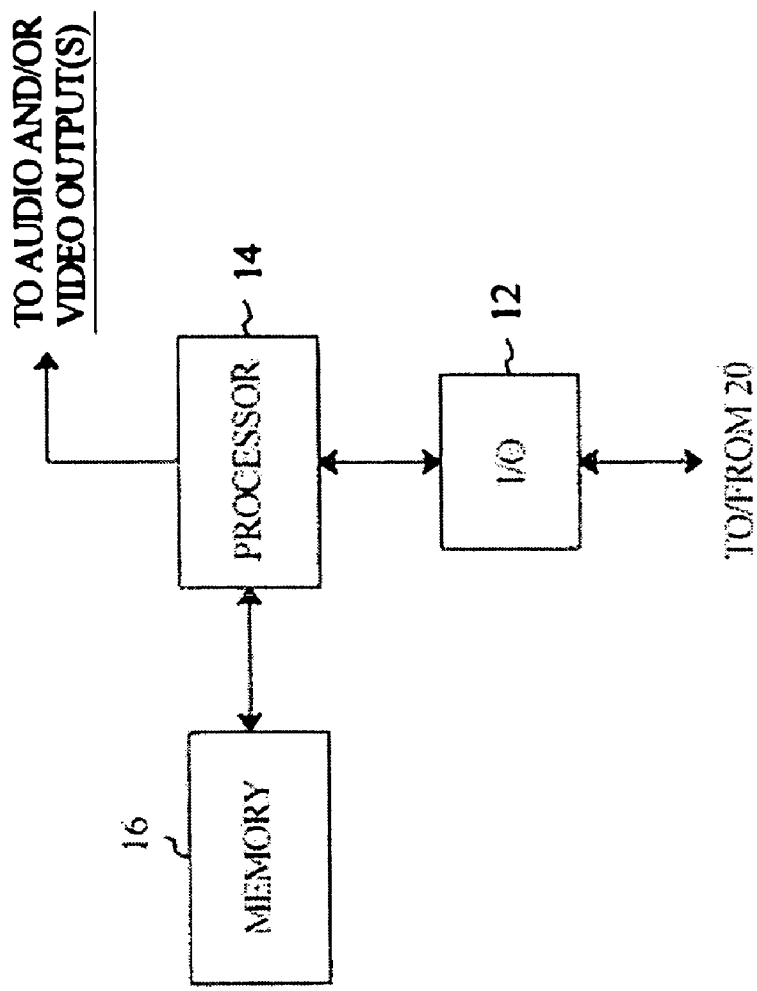
FIG. 2 shows a relevant portion of the first electronic device of FIG. 1 according to an exemplary embodiment of the present invention.

Referring now to FIG. 2, a relevant portion of first electronic device 10 of FIG. 1 according to an exemplary embodiment of the present invention is shown. As indicated in FIG. 2, first electronic device 10 comprises input/output (I/O) means such as I/O terminal 12, processing means such as processor 14, and memory means such as memory 16. For clarity of description, certain conventional elements associated with first electronic device 10 such as certain power signals, control signals and audio and/or video output elements may not be expressly shown in FIG. 2.

I/O terminal 12 is operative to perform an I/O function of first electronic device 10. According to an exemplary embodiment, I/O terminal 12 is, embodied as a multi-pin connector (i.e., male or female variety) that electrically connects first electronic device 10 to interface apparatus 20. As will be described later herein, interface apparatus 20 includes circuitry that advantageously enables first electronic device 10 to perform at least three different functions through only a single pin connection of I/O terminal 12. As such, the at least three functions can be performed through a single lead connecting the single pin of I/O terminal 12 and a pin of an I/O terminal of interface apparatus 20. This single pin connection of I/O terminal 12 may be referred to herein as the "multi-function pin connection" of I/O terminal 12.

Processor 14 is operative to perform and/or enable various functions of first electronic device 10. According to an exemplary embodiment, processor 14 comprises a plurality of ports (not expressly shown in FIG. 2) including a multi-function I/O port that is electrically connected to the aforementioned multi-function pin connection of I/O terminal 12. The multi-function I/O port of processor 14 is used to perform at least three different functions including: (i) detecting a connection between first electronic device 10 and interface apparatus 20, (ii) controlling a switching function of interface apparatus 20 to facilitate data transfer between first electronic device 10 and other devices such as electronic devices 30 and 40 (see FIG. 1), and (iii) causing interface apparatus 20 to transmit an IR control signal that controls another device such as electronic device 50 (see FIG. 1). Further details regarding processor 14 will be provided later herein.

Memory 16 is operative to perform a data storage function of first electronic device 10. According to an exemplary embodiment, memory 16 stores data that enables processor 14 to perform its various functions. Processor 14 is operative to read data from memory 16 and write data to memory 16.

Figure 3:
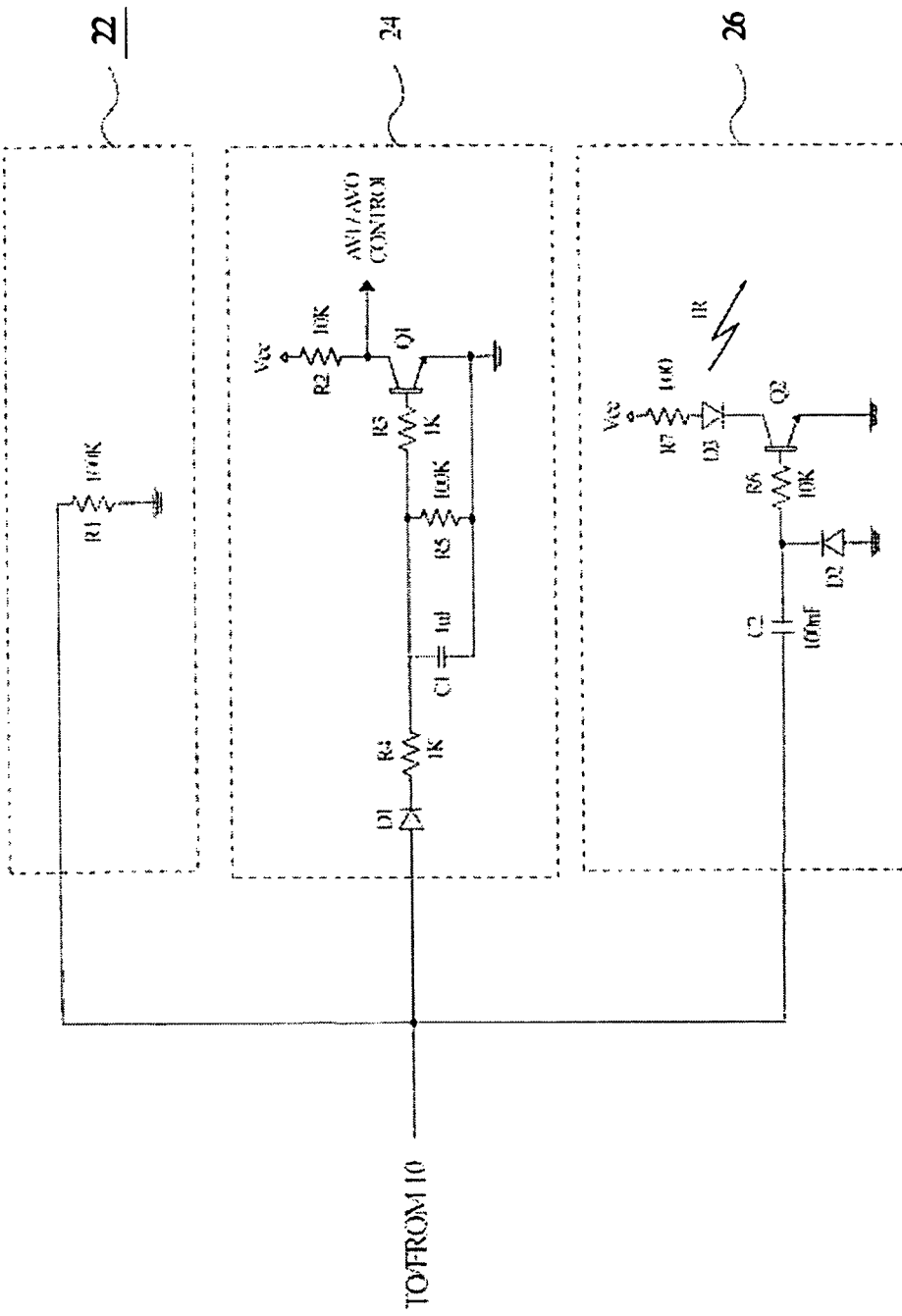
FIG. 3 shows a relevant portion of the interface apparatus of FIG. 1 according to an exemplary embodiment of the present invention.

Referring to FIG. 3, a relevant portion of interface apparatus 20 of FIG. 1 according to an exemplary embodiment of the present invention is shown. As indicated in FIG. 3, interface apparatus 20 comprises a first circuit 22, a second circuit 24, and a third circuit 26. First circuit 22 comprises resistor R1. Second circuit 24 comprises resistors R2 to R5, capacitor C1, diode D1 and npn-type bipolar junction transistor Q1. Third circuit 26 comprises resistors R6 and R7, capacitor C2, diodes D2 and D3 and npn-type bipolar junction transistor Q2. Exemplary values for the foregoing circuit elements are shown in FIG. 3, although different values may also be used in accordance with principles of the present invention. Resistance values are shown in ohms. Although not expressly shown in FIG. 3, interface apparatus 20 also includes a multi-pin connector (i.e., male or female variety, but opposite of the variety of I/O terminal 12 of first electronic device 10) that electrically connects first electronic device 10 to interface apparatus 20. According to an exemplary embodiment, the lead in FIG. 3 labeled "TO/FROM 10" represents a single pin connection of the multi-pin connector of interface apparatus 20 that is electrically connected to the multi-function pin connection of I/O terminal 12 when first electronic device 10 is electrically connected to interface apparatus 20. Accordingly, the lead in FIG. 3 labeled "TO/FROM 10" is electrically connected to the multi-function I/O port of processor 14 via the multi-function pin connection of I/O terminal 12 when first electronic device 10 is electrically connected to interface apparatus 20.

First circuit 22 is operative to provide a digital output signal that indicates a connection between first electronic device 10 and interface apparatus 20. This digital output signal enables first electronic device 10 to detect when it is connected to interface apparatus 20. According to an exemplary embodiment, processor 14 of first electronic device 10 periodically performs a two-step detection process to determine if first electronic device 10 is connected to interface apparatus 20. During the first step of this detection process (i.e., during time period t0 to t1), processor 14 sets its multi-function I/O port to a logic low state to thereby discharge capacitor C2 of third circuit 26. Next, during the second step of the detection process (i.e., during time period t1 to t2), processor 14 sets its multi-function I/O port as an input port. When the multi-function I/O port is not connected to interface apparatus 20, the input port presents a logic high signal to processor 14, and when the multi-function I/O port is connected to interface apparatus 20, resistor R1 in first circuit 22 of interface apparatus 20 serves as a voltage divider, driving the input port to a logic low state. According to an exemplary embodiment, processor 14 then determines that first electronic device 10 is connected to interface apparatus 20 if its multi-function I/O port receives a logic low signal from interface apparatus 20 during the time period t1 to t2. In this manner, first electronic device 10 can determine if it is connected to interface apparatus 20.

Second circuit 24 is operative to control a switching function of interface apparatus 20 responsive to a direct current (DC) signal from first electronic device 10. According to an exemplary embodiment, processor 14 of first electronic device 10 provides this DC signal to second circuit 24 via its multi-function I/O port and the multi-function pin connection of I/O terminal 12. The switching function of interface apparatus 20 facilitates data transfer between first electronic device 10 and other devices such as electronic devices 30 and 40 (see FIG. 1). According to this exemplary embodiment, second circuit 24 generates a digital output signal at the collector terminal of transistor Q1 responsive to the DC signal from first electronic device 10. The digital output signal from second circuit 24 causes a selection pin of analog switches or relays of interface apparatus 20 (not shown in FIGS.) to control the AVI and/or AVO paths that enable first electronic device 10 to receive audio and/or video data from electronic device 30 through interface apparatus 20 and/or transmit audio and/or video data to electronic device 40 through interface apparatus 20 (see FIG. 1). In second circuit 24, resistors R2 to R5, capacitor C1, diode D1 and transistor Q1 operate to filter any glitch noise from first circuit 22 and/or third circuit 26.

Third circuit 26 is operative to generate an IR control signal for controlling a device such as electronic device 50 (see FIG. 1) responsive to an alternating current (AC) signal from first electronic device 10 which represents a command. According to an exemplary embodiment, processor 14 of first electronic device 10 provides this AC signal to third circuit 26 via its multi-function I/O port and the multi-function pin connection of I/O terminal 12. According to this exemplary embodiment, diode D3 of third circuit 26 emits the IR control signal as a 30 kHz to 56 kHz modulated square wave responsive to the AC signal from first electronic device 10. Capacitor C2 of third circuit 26 blocks low frequency noise, and thereby allows passage of the higher frequency AC electrical signal. Diode D2 provides a discharge path for capacitor C2. The IR control signal may be used to control a device such as electronic device 50 (see FIG. 1). According to this exemplary embodiment, generation of the IR control signal by third circuit 26 does not adversely affect the transfer of audio and/or video data between first electronic device 10 and other devices such as electronic devices 30 and 40 (see FIG. 1).

Thus, a single lead in FIG. 3 labeled "TO/FROM 10" is used for performing three different functions. Circuits connected by the single lead should be grounded, so that an electrical path can be formed.

Figure 4:
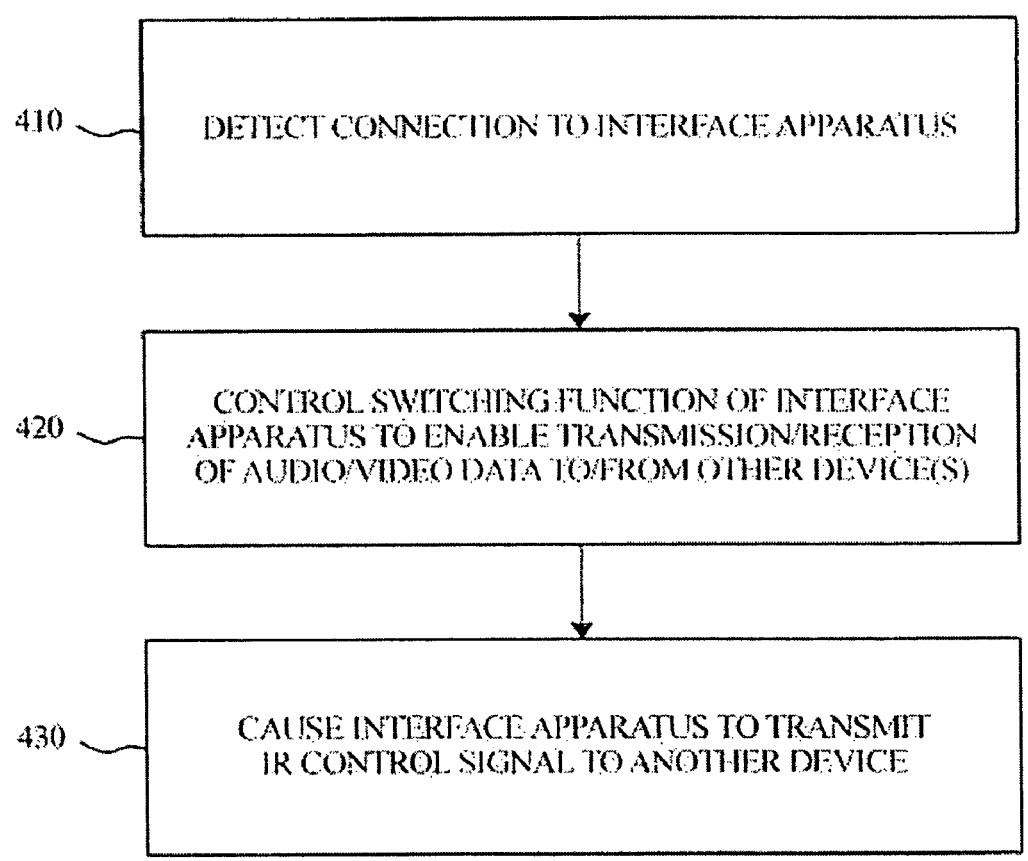
FIG. 4 shows a flowchart according to an exemplary embodiment of the present invention.

Referring to FIG. 4, a flowchart 400 according to an exemplary embodiment of the present invention is shown. For purposes of example and explanation, the steps of FIG. 4 will be described with reference to the previously described elements of FIGS. 1 to 3. The steps of FIG. 4 are exemplary only, and are not intended to limit the present invention in any manner.

At step 410, first electronic device 10 detects a connection to interface apparatus 20. As previously described herein, processor 14 of first electronic device 10 performs a two-step detection process to determine if first electronic device 10 is connected to interface apparatus 20. During the first step of this detection process (i.e., during time period t0 to t1), processor 14 sets its multi-function I/O port to a logic low state to thereby discharge capacitor C2 of third circuit 26. Next, during the second step of the detection process (i.e., during time period t1 to t2), processor 14 sets its multi-function I/O port as an input port. According to an exemplary embodiment, processor 14 then determines that first electronic device 10 is connected to interface apparatus 20 if its multi-function I/O port receives a logic low signal from interface apparatus 20 during the time period t1 to t2. In this manner, first electronic device 10 can determine that it is connected to interface apparatus 20 at step 410.

At step 420, first electronic device 10 controls the switching function of interface apparatus 20 to enable the transmission and/or reception of audio and/or video data to and/or from other devices, such as electronic devices 30 and 40 (see FIG. 1). According to an exemplary embodiment, processor 14 of first electronic device 10 provides a DC signal to second circuit 24 via its multi-function I/O port and the multi-function pin connection of I/O terminal 12 to control the switching function of interface apparatus at step 420. According to this exemplary embodiment, second circuit 24 generates a digital output signal at the collector terminal of transistor Q1 responsive to the DC signal from first electronic device 10. The digital output signal from second circuit 24 causes a selection pin of analog switches or relays of interface apparatus 20 (not shown in FIGS.) to control the AVI and/or AVO paths that enable first electronic device 10 to receive audio and/or video data from electronic device 30 through interface apparatus 20 and/or transmit audio and/or video data to electronic device 40 through interface apparatus 20 at step 420.

At step 430, first electronic device 10 causes interface apparatus 20 to transmit an IR control signal to another device, such as electronic device 50 (see FIG. 1). According to an exemplary embodiment, processor 14 of first electronic device 10 provides an AC signal to third circuit 26 via its multi-function I/b port and the multi-function pin connection of I/O terminal 12, and diode D3 of third circuit 26 transmits the IR control signal as a 30 kHz to 56 kHz modulated square wave responsive to the AC signal from first electronic device 10 at step 430. As previously indicated herein, generation of the IR control signal by third circuit 26 does not adversely affect the transfer of audio and/or video data between first electronic device 10 and other devices such as electronic devices 30 and 40 (see FIG. 1).

As described herein, the present invention provides an apparatus and method that is capable of reducing the number of required connector pins of a multi-pin connector and/or the number of required input/output (I/O) ports of a processor. The present invention may be applicable to various devices, either with or without an integrated display element. Accordingly, the phrase "electronic device" as used herein may refer to devices, systems or apparatuses including, but not limited to, television sets, computers and personal media players/recorders that include an integrated display element, and devices, systems or apparatuses such as set-top boxes, video cassette recorders (VCRs), digital versatile disk (DVD) players, video game boxes, personal video recorders (PVRs), and computers that may not include an integrated display element.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A docking station for a first electronic device, said docking station comprising:
    a first circuit operative to provide an output signal indicating a connection to said first electronic device;
    a second circuit operative to control a switching function of said docking station responsive to a direct current signal from said first electronic device, said switching function enabling transfer of at least one of audio and video data between said first electronic device and a second electronic device;
    a third circuit operative to generate a control signal for controlling a third electronic device responsive to an alternating current signal from said first electronic device; and
    wherein said output signal, said direct current signal, and said alternating current signal are transmitted between said docking station and said first electronic device through a single pin of a multi-pin connector that electrically connects said docking station to said first electronic device.

2. The docking station of claim 1, wherein said control signal is an infrared signal.

3. The docking station of claim 1, wherein said second circuit includes circuitry for filtering noise from said first circuit and said third circuit and thereby facilitating said transfer of said at least one of audio and video data between said first electronic device and said second electronic device.

4. The docking station of claim 1, wherein said switching function enables said first electronic device to receive said at least one of audio and video data from said second electronic device through said docking station.

5. The docking station of claim 1, wherein said switching function enables said first electronic device to transmit said at least one of audio and video data to said second electronic device through said docking station.

6. A method for interfacing a docking station and a first electronic device, said method comprising steps of:
using a first circuit of said docking station to provide an output signal indicating a connection between said docking station and said first electronic device;
using a second circuit of said docking station to control a switching function responsive to a direct current signal from said first electronic device, said switching function enabling transfer of at least one of audio and video data between said first electronic device and a second electronic device;
using a third circuit of said docking station to generate a control signal for controlling a third electronic device responsive to an alternating current signal from said first electronic device; and
wherein said output signal, said direct current signal, and said alternating current signal are transmitted between said docking station and said first electronic device through a single pin of a multi-pin connector that electrically connects said docking station to said first electronic device.

7. The method of claim 6, wherein said control signal is an infrared signal.

8. The method of claim 6, wherein said second circuit includes circuitry for filtering noise from said first circuit and said third circuit and thereby facilitating said transfer of said at least one of audio and video data between said first electronic device and said second electronic device.

9. The method of claim 6, wherein said switching function enables said first electronic device to receive said at least one of audio and video data from said second electronic device through said docking station.

10. The method of claim 6, wherein said switching function enables said first electronic device to transmit said at least one of audio and video data to said second electronic device through said docking station.

11. An electronic device, comprising:
first means for connecting said electronic device to a docking station;
second means for receiving an output signal from said docking station indicating a connection with said docking station, said second means generating a direct current signal for controlling a switching function of said docking station, said switching function enabling transfer of at least one of audio and video data between said electronic device and a second electronic device, said second means further generating an alternating current signal for causing said docking station to transmit a control signal that controls a third electronic device; and
wherein said output signal, said direct current signal, and said alternating current signal are transmitted between said electronic device and said docking station through a single pin of a multi-pin connector that electrically connects said electronic device to said docking station.

12. The electronic device of claim 11, wherein said control signal is an infrared signal.

13. The electronic device of claim 11, wherein said single pin is electrically connected to circuitry that filters noise and thereby facilitates said transfer of said at least one of audio and video data between said electronic device and said second electronic device.

14. The electronic device of claim 11, wherein said switching function enables said electronic device to receive said at least one of audio and video data from said second electronic device through said docking station.

15. The electronic device of claim 11, wherein said switching function enables said electronic device to transmit said at least one of audio and video data to said second electronic device through said docking station.

16. A docking station for a first electronic device, said docking station comprising:
first means for providing an output signal indicating a connection to said first electronic device, said first means controlling a switching function of said docking station responsive to a direct current signal from said first electronic device, said switching function enabling transfer of at least one of audio and video data between said first electronic device and a second electronic device, said first means further generating a control signal for controlling a third electronic device responsive to an alternating current signal from said first electronic device; and
second means having a pin for outputting said output signal, receiving said direct current signal, and receiving said alternating current signal.

17. The docking station of claim 16, wherein said first means includes circuitry that filters noise and thereby facilitates said transfer of said at least one of audio and video data between said first electronic device and said second electronic device.

* * * * *